Figure 1:
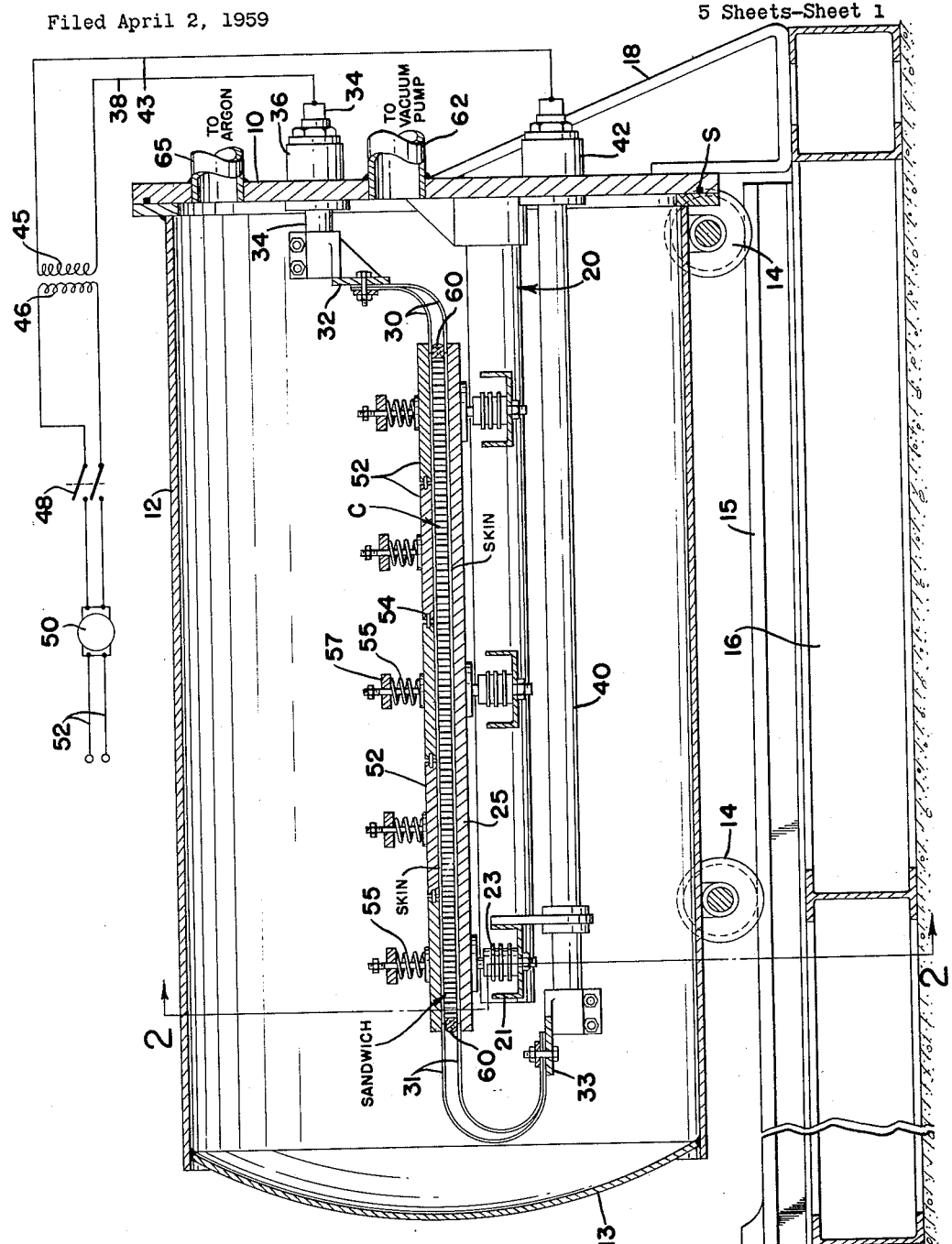

Sept. 11, 1962   E. L. KERR ETAL   3,053,969
METHOD AND APPARATUS FOR METAL STRUCTURAL PANEL CONSTRUCTION
Filed April 2, 1959   5 Sheets-Sheet 1

INVENTORS.
ELMER L. KERR,
F. TROY COPE &
ARCH PAUL PETTIT
BY Williams Tilberry & Golrick
ATTORNEYS Sept. 11, 1962   E. L. KERR ETAL   3,053,969
METHOD AND APPARATUS FOR METAL STRUCTURAL PANEL CONSTRUCTION
Filed April 2, 1959   5 Sheets-Sheet 2

INVENTORS.
ELMER L. KERR,
F. TROY COPE &
ARCH PAUL PETTIT

Williams, Tilkery & Golrick
BY
ATTORNEYS

Sept. 11, 1962  E. L. KERR ETAL  3,053,969
METHOD AND APPARATUS FOR METAL STRUCTURAL PANEL CONSTRUCTION
Filed April 2, 1959  5 Sheets-Sheet 4
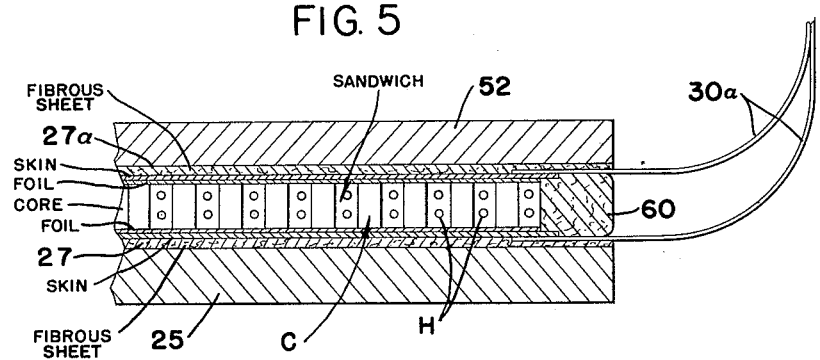
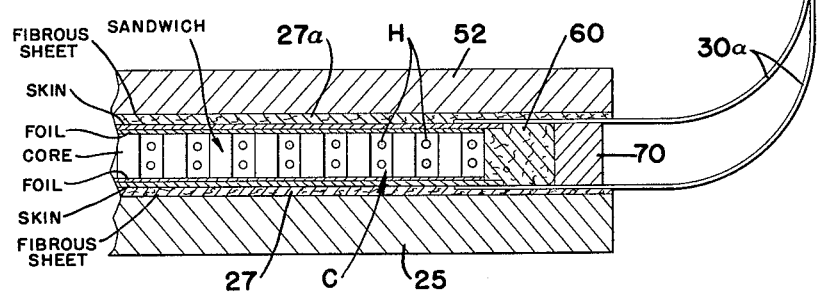
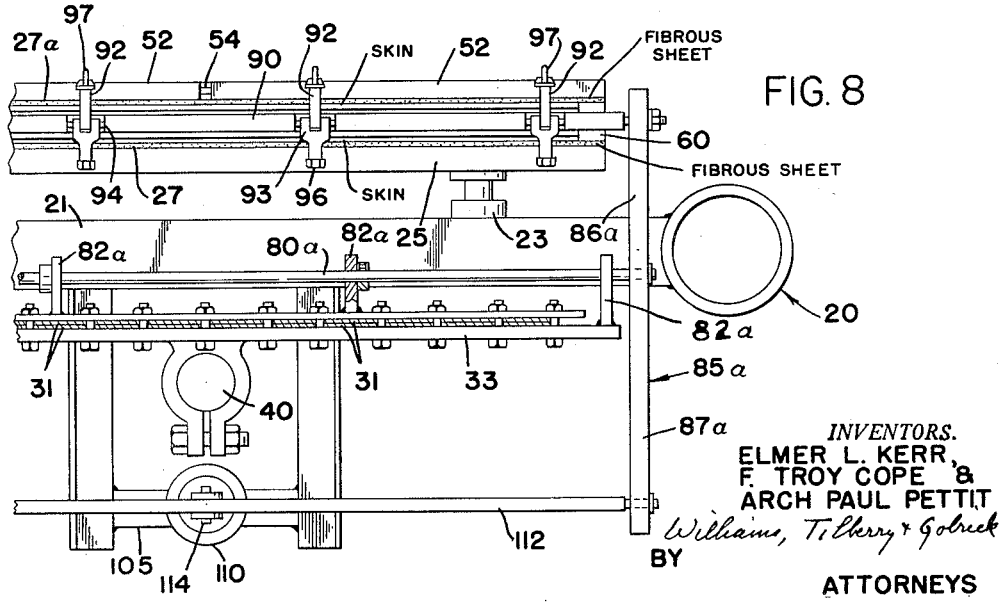
INVENTORS.
ELMER L. KERR,
F. TROY COPE &
ARCH PAUL PETTIT
Williams, Tilberry & Golrick
BY
ATTORNEYS

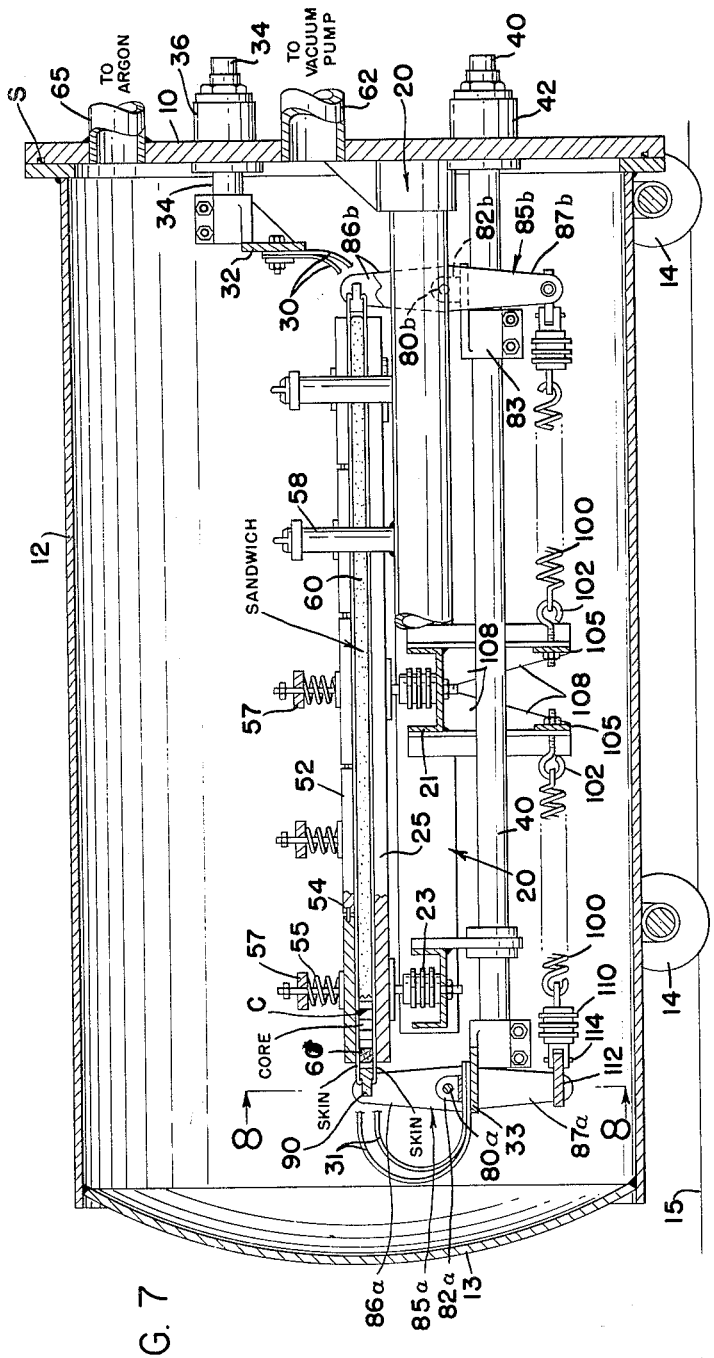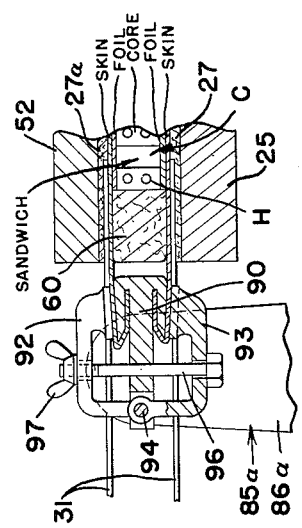

United States Patent Office 3,053,969
Patented Sept. 11, 1962

3,053,969
METHOD AND APPARATUS FOR METAL STRUCTURAL PANEL CONSTRUCTION
Elmer L. Kerr, Damascus, and F Troy Cope, Salem, Ohio, and Arch Paul Pettit, Wheeling, W. Va., assignors to The Electric Furnace Company, Salem, Ohio, a corporation of Ohio
Filed Apr. 2, 1959, Ser. No. 803,601
15 Claims. (Cl. 219—85)

This invention relates to a method and apparatus for making a metal structural panel by brazing through electric resistance heating in a controlled atmosphere. More particularly, the invention relates to the method and apparatus for making such a panel, which panel includes a metal core brazed to a metal skin, or to two skins one on each side of the core by use of a brazing material applied either as a separate foil or as a layer or coating applied to the skins.

Panels, sometimes called "sandwhiches," of the type made by the present invention are used for various purposes where a strong, stiff and yet light weight composite member is required as a component of a more elaborate structure. The panels made by the present invention may be of flat form, or curved. They may be uniform in thickness or tapered. Referring to such a panel, the constituent parts generally comprise a pair of metal skin sheets, spaced a suitable distance apart by a metal core structure occupying the space between the skin sheets. The core is made of perforated metal strips, deformed by a corrugating process, so that when assembled in proper relation they form a plurality of cells of open cross section, as hexagonal or sine shaped, which cells on assembly into a panel are bounded at their ends by the skin sheets. The cells preferably are approximately square in cross section. The nodes of contiguous core strips are in contact at diagonally opposite corners of the cells. The nodes usually are flattened so as to provide contact areas of finite width, along which the strips are spot-welded to one another. This fixes the core strips in proper relative positions, permits handling in assembly, and contributes strength to the completed assembly. The strips are fastened to the skin sheets by brazing at the lines or edge areas of contact between them and the sheets as hereafter described, frequently with the application of tension to the skins to hold them taut.

Such panels may be made of various materials which can be joined by brazing. One material favored at present is styled as Armco 17–7PH, meaning a precipitation hardening stainless steel, containing about 17% chromium, 7% nickel, .60% manganese, .40% silicon, 1.15% aluminum, and 0.7% carbon.

We are aware of the disclosure in Doble Patent Number 1,296,272 issued March 4, 1919, in which sketchy reference is made to a panel having two sheet metal skins and a core, all secured together by a "sweating process" using an "interposed fusible metal." We also are aware that panels have been made by securing the parts thereof together by resistance welding (as distinguished from brazing) in a complicated machine as shown in Weightman Patent #2,299,776 issued October 22, 1942. It further is recognized that structural panels have been made by securing the parts thereof together with a plastic adhesive.

Heretofore, such brazing as has been done has been subject to many disadvantages. The component parts of the panels or "sandwiches" have been held in position in a conventional furnace by elaborate and weighty jigs or dies of heat resisting alloy metal, sometimes including graphite blocks, evacuated metallic envelopes, and the like; and the entire mass, often quite heavy, has necessarily been heated to the required temperature. Obviously, such apparatus is large, heavy, and expensive, and the heating and cooling cycles require great lengths of time and result in consumption of large amounts of heat. With the present method and apparatus here described, such elaborate and uneconomical apparatus is eliminated, and the time and heat required are greatly reduced resulting also in an improved product.

Generally, the object of our invention is to provide an improved structural panel whose core and skin or skins are made of thin steel sheet, preferably stainless, brazed together in a unique manner by our improved process and apparatus. A further object is to provide a method and apparatus for making a panel that may be flat, or, if desired, tapered in thickness or curved to any desired form. Another object is to provide a panel in which the core joints, the core being fabricated of a plurality of strips of material, are substantially reinforced by fusible metallic material at the same time the core and skin, or skins, are brazed together. Still a further object is to provide a method and apparatus for brazing panels that is simpler and more economical than any now known, and that is repetitive in that an indefinite number of identical panels may readily be made in succession. Still another object of the invention is to provide a method and apparatus for making panels in which the skin, or skins, may be subjected to tension at the ends, and sometimes the sides, to hold the skin material taut during the brazing operation. An additional object is to provide an apparatus and method for making such panels under controlled conditions of atmosphere, pressure, and heating in a much shorter time than is now required for other panels intended for similar uses. Still an additional object is to provide such a method and apparatus wherein the entire panel may be first heated and then cooled to form the entire bonded area at one time as constrasted with making bonds in successive increments finally to produce a complete panel. Other objects of the invention will become apparent from the specification and the attached drawings. The novel features are summarized in the claims.

Figure 2:
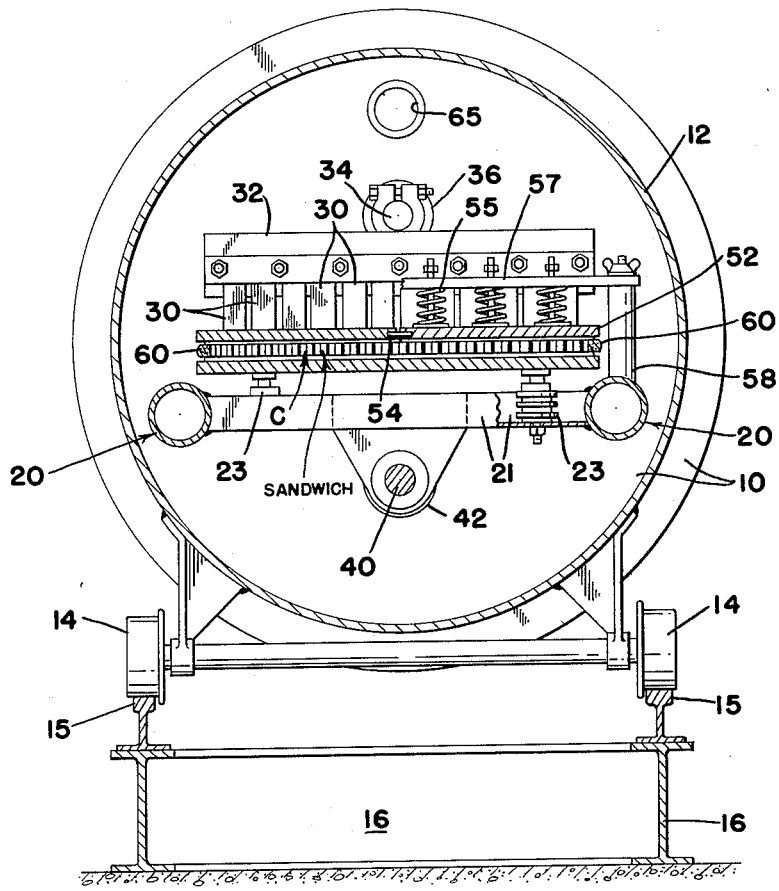
Figure 3:
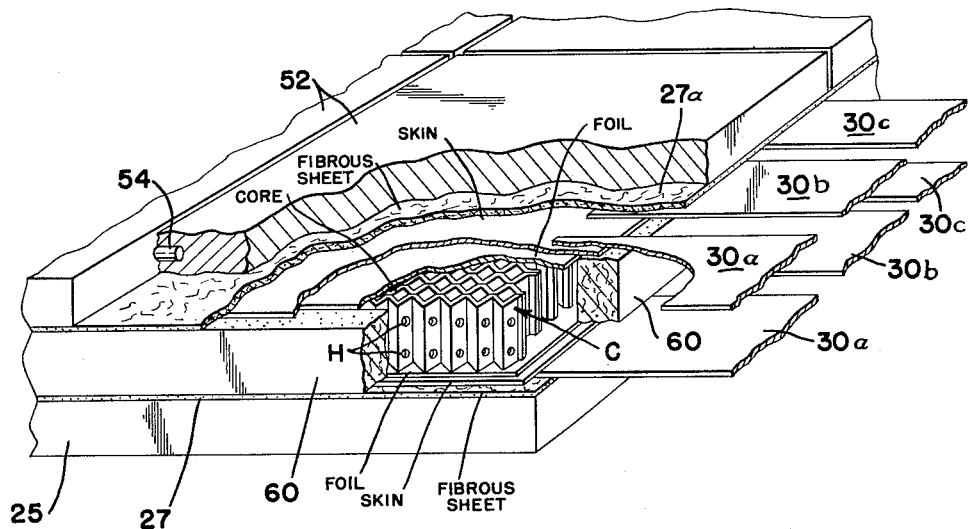
Figure 4:
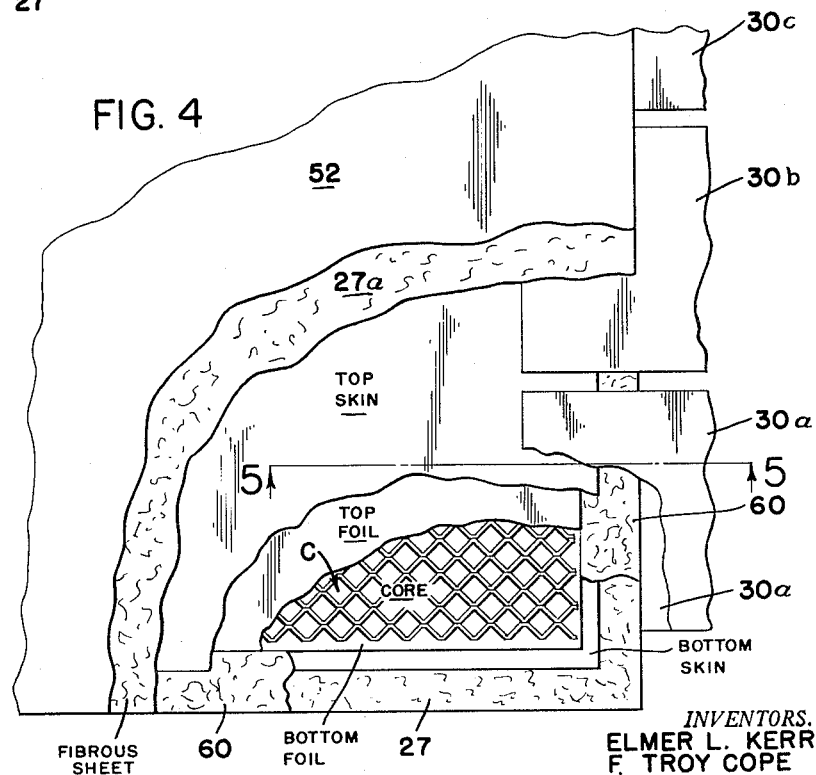

Referring now to the drawings:
FIGURE 1 is a longitudinal section through a vacuum brazing chamber, showing the panel holding devices and, in schematic, the electrical supply and connections;
FIGURE 2 is a cross section taken at line 2—2 in FIGURE 1;
FIGURE 3 is a fragmentary perspective showing an assembled panel in position to be brazed;
FIGURE 4 is a fragmentary view of a corner of a panel, in position for brazing;
FIGURE 5 is a section, taken along line 5—5 in FIGURE 4 and showing in enlarged detail the assembly of panel and current conducting strips that connect with the assembly;
FIGURE 6 is a section similar to FIGURE 5 showing a modified form of panel assembly and manner of connecting the electrodes thereto through the current conducting strips.
FIGURE 7 is a modification of FIGURE 1 showing the apparatus by which tension is applied to the skins during brazing;
FIGURE 8 is a section through FIGURE 7 as indicated by the lines 8—8 thereon; and
FIGURE 9 is a detail of the clamp by which the skins are secured to the tension apparatus.

As has been indicated above, in most cases the sandwich construction assembly that forms the present invention will have as components two skin surfaces, one on each side of the core. It is to be understood, however, that we do not limit ourselves in this regard, but that we contemplate the construction of sandwich panels in which there is a single skin brazed to a core, and, alternatively, it is contemplated that an assembly may be built up consisting of a plurality of cores with skin sections between adjacent cores and with one or more outer skin sections. This latter type of construction would be the kind used if a heat exchanger was constructed using the present invention.

In the usual form of structure embodying as components two skins and a single core, sheet steel, preferably stainless, as indicated above, is used as the material from which both core and skin are formed. In a representative example, the skin will be approximately .0100 inch thick, and the metal sheet from which the core is made will be approximately .0015 inch in thickness. The core preferably is of honeycomb cross sectional shape as shown in the drawings, but it will be understood that other core shapes, as for instance sine-shaped in cross section, may be provided without departing from the invention.

The brazing material that is used is preferably applied in the form of a foil or sheet that is interposed between each face of the honeycomb structure and the skin sheet that is to be brazed thereto. This brazing foil melts at around 1700° F. and consists principally of silver with small percentages of copper, and smaller percentages of lithium. A specific example of such an alloy is one that contains 92.8% of silver, 7% of copper, and 0.2% of lithium. It also is considered useful to apply a coating of the brazing material directly to the skin and thus avoid use of a separate sheet of foil.

The application of current to the sandwich elements and the resulting heating of the elements due to their resistance to passage of current offers a highly desirable heating method, because the principal brazed joints are those connecting the sheets to the core structure, and the joints are thus directly heated. Using this method, we prevent escape of the developed heat from the panel until the necessary equalization of temperature throughout the area to be brazed is attained; meanwhile controlling the current flow so as to develop the correct temperature. The heat and pressure needed with our method of brazing with a brazing material in an oxygen-free atmosphere are much less than needed with other methods.

To accomplish these purposes, we connect the two skin sheets of a panel to a source of electric current so as to provide parallel paths from one edge of the panel, through the sheets and the core to the opposite edge. Preferably, but not necessarily, the edges with which contact is made are the narrower edges, so that the cross-sectional area of current path is a minimum. Thus the current flows lengthwise as distinguished from crosswise of the panel. We position a thin sheet or foil of brazing alloy between each skin sheet and the adjoining face of the core. The core structure, through the foil, is in contact with these sheets, and some current flows through it, although the principal path is through the skin sheets. The electrical resistance to current flow creates the heat to melt the brazing material by heating the skins and core. Pressure applied to the components of the assembly improves transmission of both current and heat between the core and skins, and maintains good contact such as to produce good joints. As the brazing alloy melts, it is subject to surface tension, which draws the molten alloy toward the points where the core strips contact the skin sheets. In addition, some of the alloy is drawn by surface tension into nodal areas of contact between the core strips. Fillets are formed at the edges of these nodal areas, where the strips flare away from one another. When provided in proper amount and heated enough to develop proper fluidity, the alloy flows between the core strips in the spot welded areas previously described, and provides a joint of greater strength than would exist merely by virtue of the spot welds.

As stated above, the core normally is made by spot welding together a series of separate strips such that the composite forms a honeycomb as shown at C in FIGURE 3. The material forming the core will be pierced with small holes H (FIGURE 3) so that there is communication between each honeycomb space and the exterior of the core even when the two open faces are sealed by the skins. These openings permit the removal of atmospheric oxygen from all of the honeycomb spaces of the assembly at the time the brazing is accomplished, as hereafter described.

After each core has been assembled, it is accurately machined so that the opposed faces thereof are parallel and each is as nearly plane as possible. After the core has been thus prepared, it is cleaned, after which it is ready to be placed in an assembly as shown in the drawings and hereafter described. It is emphasized, however, that the present invention contemplates sandwiches of varying cross section as, for instance, sandwiches in which the core thickness is greatest at one end and tapers to the other to form a wedge-shaped sandwich with non-parallel skins. While such a core will be machined and its surfaces plane, its opposite faces obviously will not be parallel.

It has been found the skin and core may be effectively cleaned by immersion for about one minute in a solution of 10% nitric acid and 2% hydrofluoric acid, after which the parts are thoroughly rinsed, and thereafter care is taken to avoid any contamination by contact.

The central portion of the assembly making up the sandwich comprises the core. Placed against each face of the core is a sheet of brazing foil interposed between the core and the skin sheets. The brazing foil at first separates the core and skins but after it melts the parts come into intimate contact and the rehardening foil material provides a brazed interface along all the exposed core edges with the adjacent skin to produce the final panel. As hereafter described, the skins may be maintained under tension during the heating and cooling of the brazing operation.

Referring now to the drawings, there is shown a preferred form of apparatus for use in accomplishing the present invention, although it will be apparent that modifications may be made therein without departing from the scope of the invention. Such structure is best shown in FIGURES 1 and 2 and includes an air-tight chamber comprising a flat stationary closure plate or end wall 10 and a movable cylindrical tank structure 12 open at one end and at the other closed by an end plate 13. This tank with the end wall 13 is such that when tightly held against a seal S in the end wall an air-tight container results that may be evacuated as hereafter described. The tank is preferably cylindrical to provide the greatest strength and as small in volume as possible to permit rapid evacuation.

To permit insertion and removal of a panel section, the tank 12 is movably supported on wheels 14 riding on a track 15 that, in turn, is mounted on the base structure 16 of the unit, such base structure also serving as a rigid mount for the end wall 10, such mounting being effected by the frame 18, as shown at the left-hand end of FIGURE 1.

The panel assembly whose components are to be brazed, and the associated equipment used during the brazing operation, are supported within the closed tank from the end wall 10 by a cantilever construction 20 forming a framework that is cross-braced as at 21. The cantilever frame is surmounted by electrical insulators 23 mounted in the channel-shaped cross members 21. Mounted on top of the insulators 23 is a work-supporting platen or plate 25, preferably of steel or cast iron and so designed that it does not deflect appreciably from its intended surface shape during the heating and cooling operation.

The platen 25 is substantially larger in area than any sandwich panel that is to be made thereon, and thus is sufficiently long and wide to allow for lengthwise and widthwise expansion of the panel as the same becomes heated and still have the panel entirely supported thereon.

After the panel has been assembled by making a sandwich consisting of the perforated core, two skins, and a sheet of brazing foil between each skin and the core, it is placed upon the plate 25 with a layer or blanket of refractory fiber material 27 lying on the plate or platen 25 and interposed between it and the sandwich. This sheet 27 likewise is larger in area than the panel and preferably is approximately the area of the plate 25. Alternatively, the assembly may be built up by first laying the fibrous material 27 on platen 25 after the first skin is put in place, then a sheet of foil, then the honeycomb core, then the second sheet of foil, and then final skin. On top of the final skin sheet is placed a second layer of refractory fiber 27a corresponding in area to the first layer 27.

The blankets 27 and 27a are both heat and electrical insulators and form an envelope to confine the current and the heat developed thereby to the sandwich assembly. A satisfactory blanket material is Fiberfrax as made in the United States by Carborundum Company.

The complete panel or sandwich assembly is now in position on the platen or plate 25 and will have positioned in contact with it copper conductor strips that conduct the current to and from the sandwich and effect the necessary heating. The preferred arrangement of the conductor strips is best shown in FIGURES 1, 3, and 4. Such strips are preferably made of copper sheet of ample thickness and width to handle the current and overlie the panel assembly a short distance as, for instance, a quarter of an inch to three-eighths of an inch. They are located at opposite ends of the panel as shown at 30 and 31 between the outer faces of the skin sheets and the sheets 27 of refractory fiber where they are clamped or held in place by the application of pressure to the assembly as hereafter explained, the blankets 27 and 27a being somewhat deformable for this purpose.

The conductor strips 30 and 31 of copper are about equal to the thickness of the skin sheets and are, in turn, connected with copper bus bars 32 and 33, respectively. The copper bar 32 is clamped to a terminal 34 that passes through a vacuum-tight gland 36 and is connected to lead 38. Likewise, the copper bar 33 is clamped to a terminal 40, which passes through a vacuum-tight gland 42 and connects to a lead 43. Note that at least two strips 30 and two strips 31 are provided so that electrical connection is made with each end of each skin.

The current that is used for the brazing operation herein described is low frequency alternating current on the order of 60 cycles and is derived as a low-voltage high-amperage current from the secondary 45 of a transformer whose primary 46 is connected through a suitable switch 48 to a voltage regulator 50 and thence to a supply line 52.

In heating relatively narrow panels it is necessary only to use single conductor strips 30 and 31 at the ends of the sandwich, but in the case of wide panels, it is desirable to use multiple strips 30a and 30b, etc., as shown in FIGURE 3. In such case, multiple strips 31 are used at the other end of the panel. These multiple strips are shown in FIGURES 2 and 3 and in section in FIGURE 8. The purpose of these will hereafter be described.

On the top of the panel assembly on the platen 25, as described, is now placed a pressure plate made up of sections 52, as shown in FIGURES 1 and 3. If a small panel is to be brazed, a single plate will be sufficient. The sections are kept in alignment with each other by means such as dowels 54 (FIGURE 3). The use of separate plates is desirable, as distinguished from a single over-all plate, because of irregularities that may develop in the panel thickness during heating, and the desire to maintain uniform clamping pressure at all times over the unit areas of the panel. Furthermore, for large areas of panel, a single large plate would necessarily be quite heavy or would require considerable reinforcement if it was to be held against warpage.

Downward pressure on the assembly during the brazing operation is provided by a series of springs 55 that bear at their one end on the respective plate sections 52 and at their other end against cross bars 57 that, as shown in FIGURE 2, are removably secured to upright posts 58 rigidly secured to the cantilever construction 20. We have satisfactorily used pressures on the panel area of approximately two to three pounds per square inch of such area. It will be understood that in lieu of the springs described above the plate sections 52 may be of sufficient thickness and weight, or weights may be added, to provide the requisite pressure.

As previously stated, it is an object of our invention to use as little heating current as possible, and one manner in which the heating current consumption is maintained at a low level is by the use of the fiber blankets or sheets 27 that have very low thermal conductivity. This, in turn, prevents transmission of appreciable amounts of heat from the panel members into bottom platen 25 or the upper plate sections 52. In addition to such heat insulation, a rope of insulation similar in composition to the blankets 27, as indicated at 60 in FIGURES 1 and 2, is applied around the edges of the panel and between the upper and lower plates 27 and 52, respectively, between the adjacent layers of the fiber blankets 27. The blankets 27 and 27a and rope 60 form a more complete heat insulating envelope around the assembly than do blankets 27 and 27a alone.

After the panel assembly has been put in place, the strips 30 and 31 positioned, the segmental plates 52 located on top thereof, and the springs 55 brought into place by clamping the bars 57 onto the posts 58, the assembly is ready for brazing. Again, if tension is to be used, the necessary apparatus of FIGURE 7 will have been connected. At this time, the tank structure 12 rolling on the rails 15 is brought tightly against and clamped to the end structure 10 so that the seal S which extends around the entire circumference of the tank provides an airtight closure surrounding the panel. The interior of the tank is now evacuated through a vacuum connection 62, leading to a suitable vacuum pump, not shown. Such pump is continued in operation until a pressure within the tank of one micron or less has been attained and, in the event there is any leakage in the system, the pump is kept running during the entire brazing operation to maintain such a vacuum.

After the requisite vacuum has been attained, the contactor 48 is closed and, through the electrical system described, current is brought to and removed from the contact strips 30 and 31 during which such current passes end to end through the skins and core that are to be heated. Current flows in the direction of the skin sheets and principally through them although to some extent it passes through the core. The resistance of the stainless steel components of the panel to the passage of electrical current causes a temperature rise in the parts with a resultant melting of the brazing foil.

In practice, the heating current is not applied continuously but is varied in any well-known manner so that first it is supplied preferably for an initial period after which it is interrupted to allow some equalization of temperature to occur throughout the panel assembly and principally between the skins and the core. After such equalization has occurred, a somewhat higher voltage is applied through the leads 38 and 43 for a somewhat briefer period during which the final brazing action is completed. The downwardly exerted pressure of the springs 55 insures intimate contact between the skins and the core even as the brazing foil interposed between them becomes liquid and starts to flow. As examples of the voltages used, we have found that when brazing panels one-half inch in thickness, with metal thicknesses as heretofore given, an initial voltage of about three volts per foot of core length is applied for a period of about seven and one-half minutes. During the second portion of the heating period, the voltage applied is approximately four and one-half volts per foot of core length for a period of about one and one-quarter minutes. The voltages are measured at the terminals immediately outside the vacuum chamber. The current at the beginning of the initial heating period is approximately 100 amperes per inch of panel width (normal to the direction of current flow) and the current at the beginning of the final heating period is approximately 200 amperes per inch of panel width. The temperature indicated in the sandwich is approximately 1730° F.

Upon completion of the second heating period, the cooling of the assembly is begun, and we have found that this is best accomplished by gradually reducing the applied voltage from the value of four and one-half volts, mentioned above, until there is an inconsequential amount of heating current supplied. During the period in which the voltage is being dropped, the interior of the tank chamber is slowly filled with argon or a similar inert gas at room temperature through a normally closed conduit 65 until the pressure therein is slightly below atmospheric. The purpose of introducing the argon is to allow it to permeate the panel core through the small openings therein so that it passes from one core chamber successively to the next until all of them are brought to a uniform temperature and the cooling cycle is completed. After the cooling has been completed, the brazing material has solidified and the bond is completed between the core and the skins. Thereafter, the interior of the chamber is raised to atmospheric pressure by the introduction of more argon, after which the chamber is opened, the springs 55 and the segmental plates 52 are removed, the strips 30 and 31 are disconnected, and the completed panel is taken off.

In many instances it is desirable to heat treat a competed panel to produce the characteristics desired, and such heat treating cycle may be accomplished in any manner desired although it is a feature of our invention that such heat treating may be done in the tank and before the strips 30 and 31 and plates 52 are removed. Thus, after the sandwich has been brazed at temperatures of approximately 1750° F. to 1850° F., the temperature may be dropped to 1400° F. and the sandwich soaked for as much as an hour and one-half, if need be. Then, after the sandwich has been cooled to atmospheric temperature throughout, it may again be raised to an elevated temperature, in this case approximately 900° F., for further heat treatment.

As previously stated, the core material from which the sandwich is made consists of a plurality of separate sheets of steel lightly spot-welded together. While these welds are adequate in strength for many uses, it has been found that in certain instances they should be reinforced as, for example, where the stresses applied to the panels are those encountered in modern high-speed aircraft. To this end, the brazing material supplied includes somewhat more metal than needed to braze the skins and core together. Such excess of material when melted flows easily and passes over the surface of the core elements, particularly along the nodes thereof, and provides a braze or reinforcement to the spot welds. Such metal flow is caused not only by gravity from the top layer but from the capillary action (surface tension) of the molten brazing metal so that the bottom layer also contributes to sealing the fillets of the core.

A modified form of assembly in which the contact strips 30 and 31 do not overlie the core proper is shown in FIGURE 6. In this figure the skin sheets at both their ends substantially overhang the core, as shown. A rope insulating element 60, similar to that previously described, is inserted between the skin sheets closely adjacent the core and at each end thereof. On the exterior of each rope is located a filler bar 70 that has the same thickness as the sandwich. Between the respective filler bars and the skin sheets there are located at each end of the sandwich contact strips 30a, as shown, and 31b, not shown but arranged in the same manner. The platen 25 and the upper plate sections 52 are of such area that they extend beyond the filler bar 70, as shown, and due to the pressure of the springs 55 hold the contact strips in place under sufficient pressure to make good electrical contact with the skins and supply current to the panel assembly. After the assembly has been completely brazed and taken out of the tank 12, and the bar 70 and rope 60 removed, that portion of the skin that stands free of the core may either be trimmed off or may be used as a place to which reinforcing ribs or other structural elements may be connected.

It has been found, as indicated above, that frequently it is desirable to maintain lengthwise tension on the skin sheets during the brazing operation. Such tension eliminates any tendency of the skins to buckle and maintains them in close contact with the core to insure the formation of good brazed connections. The tension that is applied is substantial and will vary depending upon the area, length and thickness of the skins and the clamping pressure exerted by the springs 55 or their equivalent. The tension will, however, be sufficient to overcome such clamping pressure as springs 55 provide and also will be sufficient to hold the skins taut. The tension applied remains in effect at all times during the brazing operation and yet permits expansion of the skins as they are heated and contraction as they are cooled.

One form of construction by which this tension result is obtained is shown in FIGURES 7, 8 and 9. As stated, tension is not always used but when it is used it may be applied by the apparatus shown herein. The use of the tension apparatus in no way alters the description above of the manner in which the panels are assembled, clamped, heated, and subjected to an oxygen-free atmosphere. Referring now to FIGURES 7, 8 and 9, there is shown at the left-hand end of FIGURE 7 a pivot point 80a, and at the right-hand end a pivot point 80b, established respectively by lugs 82a adjacent the terminal 40 and secured to bar 33, and by lugs 82b at the right-hand end of apparatus secured by clamps 83 to the rigid terminal 40, as shown. Each of the pivots 80a and 80b supports a respective pivot arm 85a and 85b, as shown, each with an upwardly extending leg 86a and 86b and a lower leg 87a and 87b. Two pivot or lever arms 85 are provided at each end of the assembly, one on each side of the assembly and outside the contact members 30 and 31, as the case may be.

The tension assemblies at the right and left ends of FIGURE 7 are for all practical purposes duplicates and, thus, the description in connection with the left-hand end of FIGURE 7 and the showing in FIGURES 8 and 9 will suffice to explain the construction of both assemblies. To this end, a stretcher bar 90 is pivotally mounted on the upper legs 85a, as shown, and is so arranged that the upper and lower skins of the sandwich assembly may be clamped to it. This clamping is effected (FIGURE 9) by two clamping ears 92 and 93 pivoted to the stretcher bar 90 at 94 and adapted to bear down on the portion of the stretcher bar engaged by the skins as shown. Clamping of the assembly is effected by through bolts 96 and wing nuts 97. It will be seen that the stretcher bar is provided with a V-groove on each side to receive the respective bent-over ends of the skins and assist in the clamping action.

Spring pressure is applied to the arms 85 in such manner as to urge the stretcher bar at each end of the apparatus away from the adjacent panel assembly and apply tension to the skins. Such pressure is applied by the use of a heavy tension coil spring 100. More than one spring may be used, placing them side by side. One end of the spring is secured by an adjustable nut and bolt 102 (to control and adjust spring tension) to a plate 105 welded to the channel member 21, which is braced with a web plate 108 welded to the outside of the channel and to the plate 105. The opposite end of the spring is connected through an insulator 110 to an equalizer beam 112 in any suitable manner as by a pin 114. The equalizer beam extends the full width of the sandwich area and is pivotally secured at its opposite ends to the lower arms 87a of the levers 85a, respectively. It will be apparent that the lever arms 85a and 87a need not be equal in length but may be of different ratio with respect to each other, thereby to control the tension on the skins and the extent to which the spring must stretch to produce the desired movement at the stretcher bar. As stated above, corresponding parts of the tension assembly on the right-hand side of FIGURE 7 correspond with those just described at the left-hand side of this figure and function in the same way but in an opposite direction.

It is contemplated that it may sometimes be necessary to apply tension to the side edges as well as to the end edges of a panel assembly, particularly as such assembly becomes wide and approaches a square in shape. Similar tension apparatus would be used, as will be familiar to one working in the art.

Referring now again to the use of an evacuated chamber for the brazing and to the admission of argon for cooling, it should be emphasized that the fundamental purpose in the evacuation procedure is to reduce as much as possible heat loss from the brazing assembly to the tank members 10, 12, and 13 due to the known fact that relatively little heat is transmitted through a substantially perfect vacuum. Likewise, it should be emphasized that the fundamental requirement for the interior of the tank during brazing is to provide an oxygen-free atmosphere. Thus, in our invention we do not limit ourselves to the use of a vacuum followed by the use of argon, but contemplate that other oxygen-free gases may be used and that, to the extent heat transmission to the sides of the tank is permissible, the use of vacuum may be dispensed with so long as substantially no oxygen is present during brazing and subsequent cooling.

From the foregoing description it will be seen that we have provided an improved method and apparatus for making a metal sandwich panel construction. It will be apparent to those skilled in the art that modification may be made in the above disclosure without departing from the invention that is summarized in the claims.

We claim:

1. In apparatus of the class described for use in forming a honeycombed metal structural member, the improvement comprising: a vessel adapted to be opened and closed, including an end portion and a container portion adapted to be shiftably positioned in sealing relationship one with the other; a cantilever platen mounted in said vessel, said platen being adapted to support components of said structural member assembly; pressure means within the said vessel to apply pressure to said assembly and to hold the components of said assembly in a pre-determined assembled position; means to produce a vacuum in said vessel; electrical and heat insulating means interposed between said assembly and said platen; electrical and heat insulating means interposed between said assembly and said pressure means; a source of electric current; electrodes connected to said source and positioned to rest on the surface of said assembly at opposite ends to pass current across said surface, and, due to the resistance to said current, heat the same to brazing temperature.

2. The apparatus set forth in claim 1, wherein said electrodes are held on the surface of said assembly by said pressure means.

3. The apparatus set forth in claim 1 including means to cool said structural member after brazing by introducing a non-oxidizing gas under pressure into said vessel.

4. The apparatus set forth in claim 1 including means within said vessel to grip opposite ends of said assembly in tension.

5. The apparatus set forth in claim 1, wherein said electrodes include a plurality of contract strips placed on the surfaces of the opposite ends of said skins.

6. The apparatus set forth in claim 1 including a plurality of pressure plates positioned on said upper insulating means, spring support means secured to said cantilever platen, and spring pressure means interposed in compression between said pressure plates and said spring support means to apply pressure to said structural member.

7. The apparatus set forth in claim 1 including means to prevent warping of said structural member including a pair of levers pivotally secured to said platen and positioned at opposite ends of said structural member, each lever having at one end clamping means for gripping one end of said structural member, and at the opposite end spring means connected in tension between said lever and said platen to urge said clamp means in a tensioning direction.

8. In apparatus of the class described for use in forming a honey combed metal structural member, the improvement comprising: a vessel adapted to be opened and closed, including an end portion and a container portion adapted to be shiftably positioned in sealing relationship one with the other; a cantilever platen mounted in said vessel, said platen being adapted to support components of a structural member assembly including at least one skin member and a core member; means within said vessel to apply pressure to said assembly and to hold the components of said assembly in a pre-determined assembled position; means to produce a vacuum in said vessel; electrical and heat insulating means interposed between said assembly and said platen; electrical and heat insulating means interposed between said assembly and said pressure means; a source of electric current; electrodes connected to said source and placed on the surface of said skin at opposite ends to pass current substantially through said skin and, due to its resistance to said current, heat the same to brazing temperature.

9. The apparatus set forth in claim 5, wherein said vessel is thin walled, and non-insulated.

10. In apparatus of the class described for use in forming a metal structural member, the improvement comprising: an uninsulated, thin walled vessel adapted to be opened and closed, including an end portion and a container portion adapted to be shiftably positioned in sealing relationship one with the other; a cantilever platen mounted in said vessel, said platen being adapted to support components of a structural member assembly including two skin members and an interposed core member; means within said vessel to apply pressure to said assembly and to hold the components of said assembly in a predetermined assembled position; means to produce a vacuum in said vessel; electrical and heat insulating means interposed between said assembly and said platen; electrical and heat insulating means interposed between said assembly and said pressure means; a source of electric current; electrodes connected to said source and placed to rest on the surfaces of said skins at opposite ends to pass current substantially therethrough and, due to their resistance to current, heat the same to brazing temperature.

11. The method of forming a structural member assembly comprising skin means and core means bonded together, including the steps of: positioning the core and skin means against each other but separated by a layer of brazing material; producing a vacuum around said structural assembly; applying pressure to said assembly to hold said components thereof tightly together; passing electric current through said skin means to melt said brazing material; and thereafter cooling said assembly by reducing said vacuum surrounding said structural member and by introducing in lieu thereof a selected non-oxidizing gaseous atmosphere under pressure to permeate said structural member until cooled.

12. The method set forth in claim 11, including the steps of first applying current at a pre-selected rate to accomplish a first heating stage, and thereafter a second preselected rate to accomplish a second heating stage.

13. The method set forth in claim 11, including the step of simultaneously introducing current at a plurality of regions around the edges of said skins to induce a flow of current uniformly therethrough.

14. The method set forth in claim 8, including the step of tensioning said skin means prior to heating.

15. The method of forming a structural member assembly comprising a pair of skin members and a core section bonded therebetween including the steps of positioning the core and skin members against each other but separated by layers of brazing material; placing said assembly in an uninsulated thin walled pressure vessel that can be sealed from the atmosphere; applying mechanical pressure to said assembly to hold the components there tightly together; evacuating said vessel; passing a low voltage-high amperage electric current through said skins to melt said brazing material; and thereafter introducing a non-oxidizing gas under pressure into said evacuated vessel to cool the structure member assembly after brazing.

References Cited in the file of this patent
UNITED STATES PATENTS

| | | |
|---|---|---|
| 224,612 | Sawyer | Feb. 17, 1880 |
| 533,795 | Edwards | Feb. 5, 1895 |
| 853,351 | Fulton | May 14, 1907 |
| 1,260,940 | Pfanstiehl | Mar. 26, 1918 |
| 1,469,043 | Laise et al. | Sept. 25, 1923 |
| 1,863,073 | Smythe | June 14, 1932 |
| 2,902,589 | Wirta | Sept. 1, 1959 |
| 2,926,761 | Herbert | Mar. 1, 1960 |
| 2,984,732 | Herbert | May 16, 1961 |

UNITED STATES PATENT OFFICE
CERTIFICATE OF CORRECTION

Patent No. 3,053,969            September 11, 1962

Elmer L. Kerr et al.

It is hereby certified that error appears in the above numbered patent requiring correction and that the said Letters Patent should read as corrected below.

Column 1, line 20, for "called "sandwhiches," of" read -- called "sandwiches," of --; column 4, line 58, for "left-hand" read -- right-hand --.

Signed and sealed this 4th day of June 1963.

(SEAL)
Attest:

ERNEST W. SWIDER
Attesting Officer

DAVID L. LADD
Commissioner of Patents